United States Patent [19]
Rudd et al.

[11] 3,873,293
[45] Mar. 25, 1975

[54] METHOD AND APPARATUS FOR PRODUCTION OF GLASS TUBING

[75] Inventors: John Duncan Rudd, Newburgh, near Wigan; Michael Hill Davie, Crank, near St. Helens; Malcolm James Rigby, Haydock, near St. Helens, all of England

[73] Assignee: Pilkington Brothers Limited, Liverpool, England

[22] Filed: Sept. 8, 1972

[21] Appl. No.: 287,384

[30] Foreign Application Priority Data
Sept. 13, 1971 United Kingdom ............ 42560/71

[52] U.S. Cl. ............................ 65/84, 65/86, 65/186, 65/187
[51] Int. Cl. ............................................. C03b 15/14
[58] Field of Search ......................... 65/83–89, 187, 65/188, 189, 190, 191, 186; 417/171

[56] References Cited
UNITED STATES PATENTS
3,260,586    7/1966    Prohaszka et al. ...................... 65/86
3,418,688    12/1968    Clarke .............................. 65/188 X
3,554,723    8/1967    Wilson ................................... 65/86

FOREIGN PATENTS OR APPLICATIONS
1,020,762    12/1957    Germany ........................... 417/171

*Primary Examiner*—Robert L. Lindsay, Jr.
*Attorney, Agent, or Firm*—Sughrue, Rothwell, Mion, Zinn and Macpeak

[57] ABSTRACT

In apparatus for producing glass tubing by drawing molten glass from an annular opening, at least one air induction device is provided for cooling the hot glass tubing, the air induction device being arranged to induce a flow of atmospheric air by means of a smaller flow of air under pressure and to direct the flow of atmospheric air over the external surface of the hot glass tubing. The air induction device comprises a venturi-shaped nozzle which is disposed substantially coaxially with the path of the hot glass tubing.

6 Claims, 3 Drawing Figures

3,873,293

METHOD AND APPARATUS FOR PRODUCTION OF GLASS TUBING

BACKGROUND OF THE INVENTION

This invention relates to apparatus and methods for producing glass tubing by drawing hot glass from an annular opening. It is particularly, though not exclusively, applicable to apparatus of the Vello type in which molten glass is drawn through the annular opening between a vertical mandrel and a circular opening in the bottom of a special forehearth, known as a "bowl", communicating with a glass melting furnace.

When the tubing has been drawn, it must be cooled until it is substantially rigid before it can be cut into desired lengths. Because the temperature of the molten glass is necessarily very high, cooling by normal unassisted heat loss to the surrounding atmosphere takes a considerable time and therefore requires a long drawing run between the opening from which the tubing is drawn and the cutting means, while also restricting the drawing speed. Various proposals have been made for forced cooling of the hot glass tubing but they have generally involved considerable complication and expensive additional apparatus.

SUMMARY OF THE INVENTION

According to the invention, in apparatus for producing glass tubing by drawing molten glass from an annular opening, at least one air induction device is provided for cooling the hot glass tubing, the air induction device being arranged to induce a flow of atmospheric air by means of a smaller flow of air under pressure and to direct the flow of atmospheric air over the external surface of the hot glass tubing.

Preferably the air induction device comprises a venturi-shaped nozzle which is disposed substantially coaxially with the path of the hot glass tubing and which is formed with a narrow annular aperture upstream of its narrowest portion, and means are provided for injecting the flow of air under pressure into the nozzle through the annular aperture so as to induce the flow of atmospheric air through the nozzle.

According to another aspect of the invention, a method of cooling hot glass tubing after it has been drawn from molten glass through an annular opening comprises passing the hot glass tubing through at least one air induction device which induces a flow of atmospheric air by means of a smaller flow of air under pressure and directs the flow of atmospheric air over the external surface of the hot glass tubing. Such air induction devices are commercially available. They effectively induce a large flow of air through the venturi-shaped nozzle when a small supply of air under prssure is injected through the annular aperture. The normal recommended practice is to leave the interior of the nozzle unobstructed, but we have found that if sufficient clearance is left between the glass tubing and the interior of the nozzle (say one-fourth inch minimum) the air induction device still functions effectively and the induced air extracts a substantial quantity of heat from the glass.

BRIEF DESCRIPTIONS OF THE DRAWINGS

DESCRIPTION OF THE PREFERRED EMBODIMENT

Figure 1:
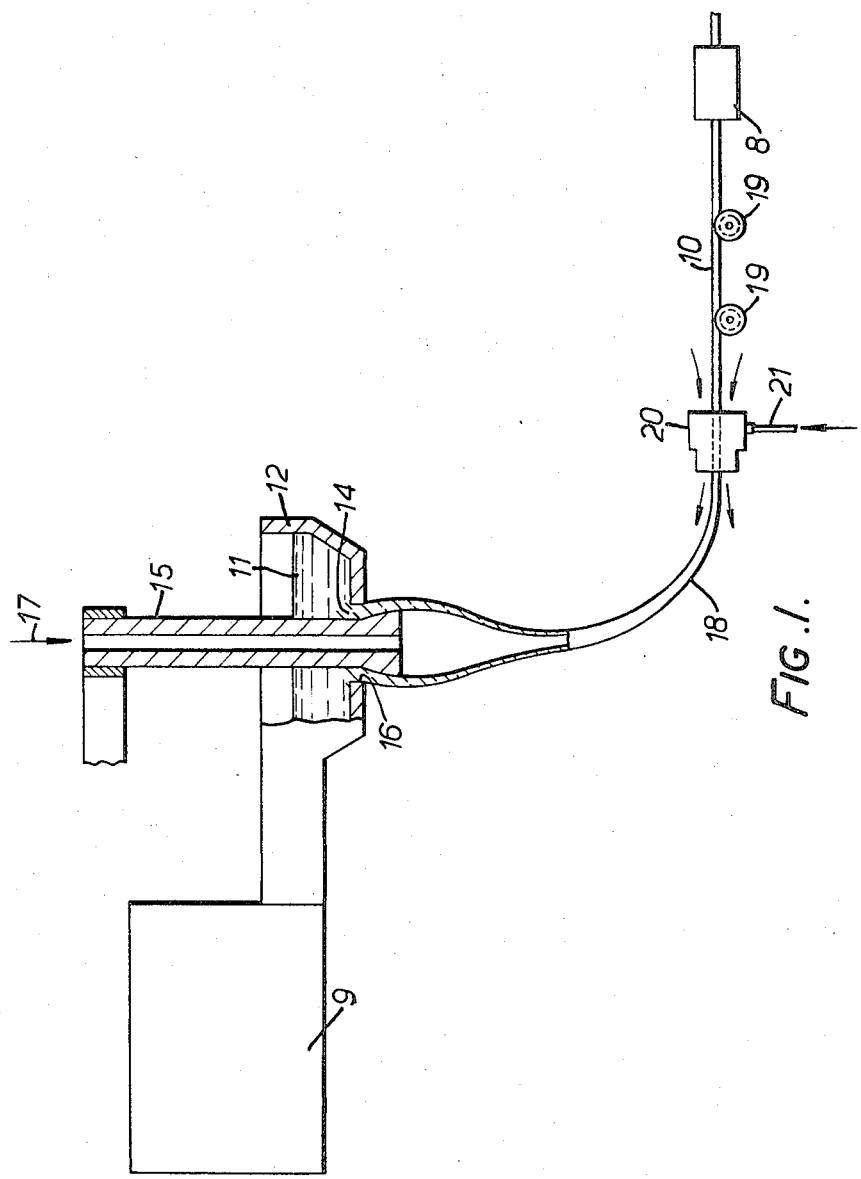
FIG. 1 is a diagrammatic illustration of a Vello type apparatus equipped with an air induction cooling device.

As shown in FIG. 1, the glass tubing 10 is produced from molten glass 11 contained in a forehearth or bowl 12 communicating with a glass melting furnace shown schematically at 9. The molten glass is drawn off through the annular opening 14 between a vertical rotating hollow mandrel 15 and a circular opening 16 in the bottom of the bowl 12. Air is blown through the mandrel 15 in the direction of the arrow 17 and the hot tubing, in the plastic state, passes in a catenary curve 18 from the vertical to a horizontal position, in which it is supported by rollers 19, and thence to drawing means 8.

To increase the rate of cooling of the hot glass tubing and thereby to reduce the length of the drawing run and/or to increase the speed at which the tubing can be drawn, an air induction cooling device 20 is disposed co-axially around the path of the hot glass tubing at or near the end of the catenary curve 18. The device 20 is of a known type, in which a comparatively small supply of air under pressure, fed to the inlet 21, induces a comparatively large flow of atmospheric air axially through the device.

Figure 2:
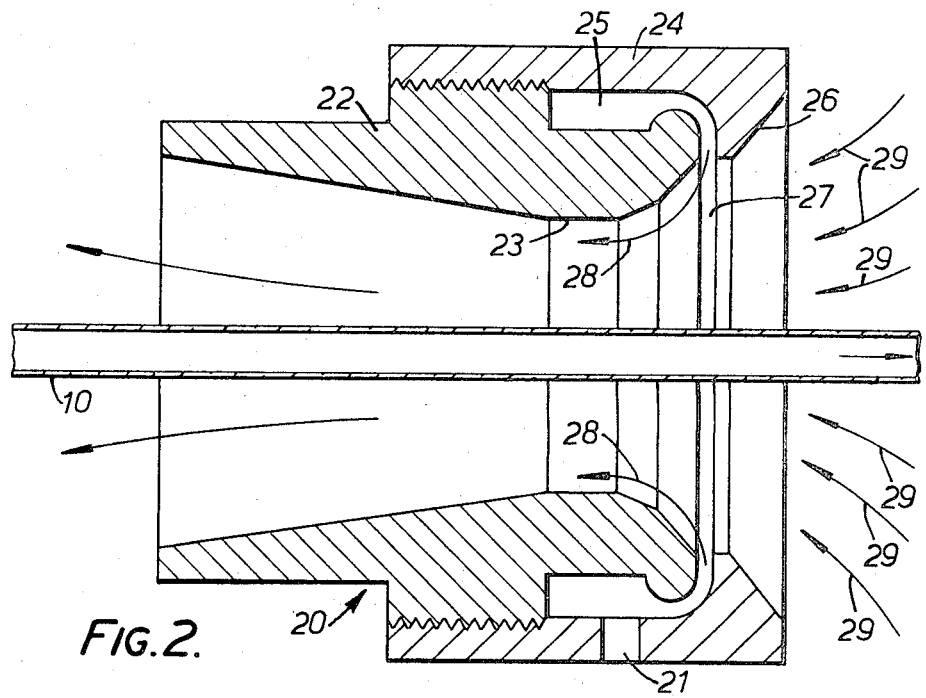
FIG. 2 is a sectional view, to a larger scale, of the air induction device.

The air induction device 20, with the hot glass tubing 10 passing through it, is illustrated in section in FIG. 2. It comprises a nozzle body 22 having a venturi-shaped inner surface 23, and a cap 24 screwed on the body 22 and defining with it an annular chamber 25. The inner surface 26 of the cap 24 generally continues the profile of the surface 23 of the body, so that the cap and body together form a venturi-shaped nozzle, but a narrow annular aperture 27, much exaggerated in size in FIG. 2 for clarity, between the cap and body communicates with the annular chamber 25. The width of the aperture 27 can be adjusted by screwing the cap 24 further on or off the body 22.

Figure 3:
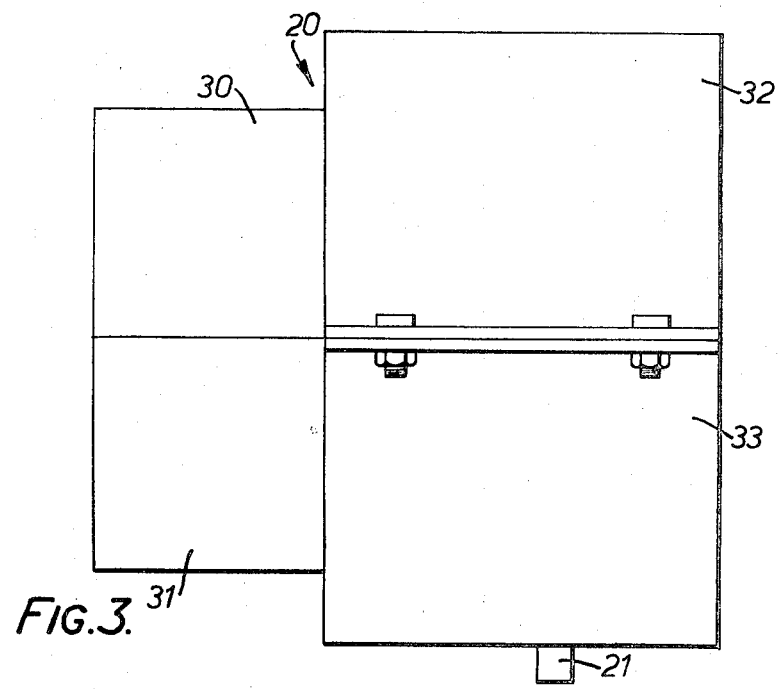
FIG. 3 is an external view of a modified air induction device.

In an alternative form shown in FIG. 3, which has been found more convenient in certain circumstances, the air induction device 20 is of a similar internal form to that illustrated in FIG. 2 but is split longitudinally so that its two halves 30 and 31 can be assembled around the tubing 10 after drawing has commenced. The screwed cap 24 is replaced by a split plain cap whose halves 32 and 33 are bolted to the respective halves of the body 22, and the gap 27 can be adjusted by the use of distance pieces of different thicknesses between the cap and body. With either form of the device, compressed air supplied to the chamber 25 through the inlet 21 flows in the direction of arrows 28, following the curve of the inner surface 23 of the body 22, due to the coanda effect, and induces a much larger flow of atmospheric air in the direction of arrows 29 through the nozzle and over the surface of the glass tubing 10.

As shown, the direction of the induced air flow is opposite to the direction of movement of the glass tubing 10, so that the velocity of the air relative to the tubing is high and a maximum heat transfer efficiency is obtained.

A minimum clearance of one-fourth inch has been found to be generally required between the glass tubing 10 and the inner surface 12 of the nozzle, but provided such clearance is provided the air induction device still functions effectively in spite of the presence of the glass tubing 10. In a specific example, drawing a glass tube of 11 mm. external diameter and 1 mm. wall thickness, with a clearance from the inner surface 23 of three-fourths inch, and with the width of the aperture 27 adjusted to 0.007 inch, and supplying compressed air at a pressure of 60 pounds per square inch to the inlet 21, a rate of heat extraction from the glass tubing of 210 watts/square metre/°C was measured.

We claim:

1. Apparatus for producing tubing comprising means for drawing molten glass from an annular opening, at least one air induction device downstream of the annular opening for cooling the hot glass tubing, the air induction device having a first air inlet leading from the atmosphere to a venturi-shaped nozzle which is disposed substantially coaxially with the path of the hot glass tubing and which is formed with a narrow annular aperture downstream of its narrowest portion, said aperture forming a second air inlet for connection to a source of air under pressure and means are provided for injecting the flow of air under pressure into the nozzle through the annular aperture so as to induce a flow of atmospheric air through the first inlet, and an outlet facing in an upstream direction arranged to direct a flow of induced air over the external surface of the hot glass tubing.

2. Apparatus according to claim 1 including a container for molten glass having a downwardly facing annular opening, horizontal support means for supporting tubing drawn from the annular opening, and drawing means for advancing the tubing along the support means, and wherein the air induction device is located between the annular opening and the horizontal support means.

3. A method of cooling hot glass tubing after is has been drawn from molten glass through an annular opening, comprising passing the hot glass tubing through at least one air induction device, inducing a flow of atmospheric air through the device from a first inlet to an outlet by directing into the device through a second inlet a smaller flow of air under prssure, and directing the flow of atmospheric air over the external surface of the hot glass tubing in a direction opposite to the direction of movement of the tubing.

4. A method according to claim 3, wherein the air induction device comprises a venturi-shaped nozzle which is disposed substantially co-axially with the path of the hot glass tubing and which is formed with a narrow annular aperture upstream of its narrowest portion, and the flow of air under pressure is injected into the nozzle through the annular aperture so as to induce the flow of atmospheric air through the nozzle.

5. A method according to claim 4, wherein a clearance of at least one-fourth inch is left between the hot glass tubing and the interior of the nozzle.

6. A method according to claim 3 wherein the tubing is drawn vertically downwards from the annular opening and curved so as to pass onto horizontal support means, the cooling by the air induction device being effected before the tubing passes onto the horizontal support means.

* * * * *